US006762929B2

(12) United States Patent
Sawyer

(10) Patent No.: US 6,762,929 B2
(45) Date of Patent: Jul. 13, 2004

(54) DISPLAY SUPPORT APPARATUS

(75) Inventor: Michael D. Sawyer, Sioux City, IA (US)

(73) Assignee: Gateway, Inc., Poway, CA (US)

(*) Notice: Subject to any disclaimer, the term of this patent is extended or adjusted under 35 U.S.C. 154(b) by 13 days.

(21) Appl. No.: 10/242,081

(22) Filed: Sep. 12, 2002

(65) Prior Publication Data

US 2004/0052037 A1 Mar. 18, 2004

(51) Int. Cl.$^7$ .................................................. G06F 1/16
(52) U.S. Cl. ....................... 361/681; 361/679; 361/682; 248/535; 345/905; 455/90
(58) Field of Search ............................. 361/681, 683, 361/682, 679, 680; 312/223.1, 223.2, 265.6; 248/535, 536, 917; 345/169, 905, 101, 173, 170, 4, 85, 168, 84; 455/90, 575, 566, 556, 344, 573; 40/514, 515, 517; 160/296, 238, 243

(56) References Cited

U.S. PATENT DOCUMENTS

| | | | | |
|---|---|---|---|---|
| 4,979,554 | A | 12/1990 | Nelson | 160/135 |
| 5,285,908 | A | 2/1994 | Rogers | 211/118 |
| 5,884,424 | A | 3/1999 | Smith | 40/610 |
| 6,226,931 | B1 | 5/2001 | Haversat | 52/71 |
| 6,332,284 | B1 | 12/2001 | Tafforeau | 40/603 |
| 6,643,124 | B1 * | 11/2003 | Wilk | 361/681 |

FOREIGN PATENT DOCUMENTS

| | | | | |
|---|---|---|---|---|
| JP | 404178684 A | * | 6/1992 | G09F/9/30 |
| JP | 409160506 A | * | 6/1997 | G09F/9/00 |
| JP | 410339866 A | * | 12/1998 | G02F/1/1333 |
| JP | 411109880 A | * | 4/1999 | G09F/9/00 |

OTHER PUBLICATIONS

Hack et al (US patent application Publication US 2003/0144034A1).*
Hemia et al (US patent application Publication US 2001/0003450A1).*
Lee et al (US patent application Publication US 2003/0160735A1).*
Dowling et al (US patent application Publication US 2003/0050019A1).*
Chen (US patent application Publication US 2002/0118151A1).*
Fujieda et al (US patent application Publication US 2002/0070910A1).*
Salmon (US patent application Publication US 2003/0048256A1).*

\* cited by examiner

*Primary Examiner*—Michael Datskovskiy
(74) *Attorney, Agent, or Firm*—Scott Charles Richardson; Kevin E. West; Suiter - West

(57) ABSTRACT

A flexible display extension apparatus for supporting a flexible panel display in a viewing position. The extension apparatus includes an extension member that may be collapsed for allowing the flexible panel display to be at least partially rolled upon itself when the display is not in use.

33 Claims, 9 Drawing Sheets

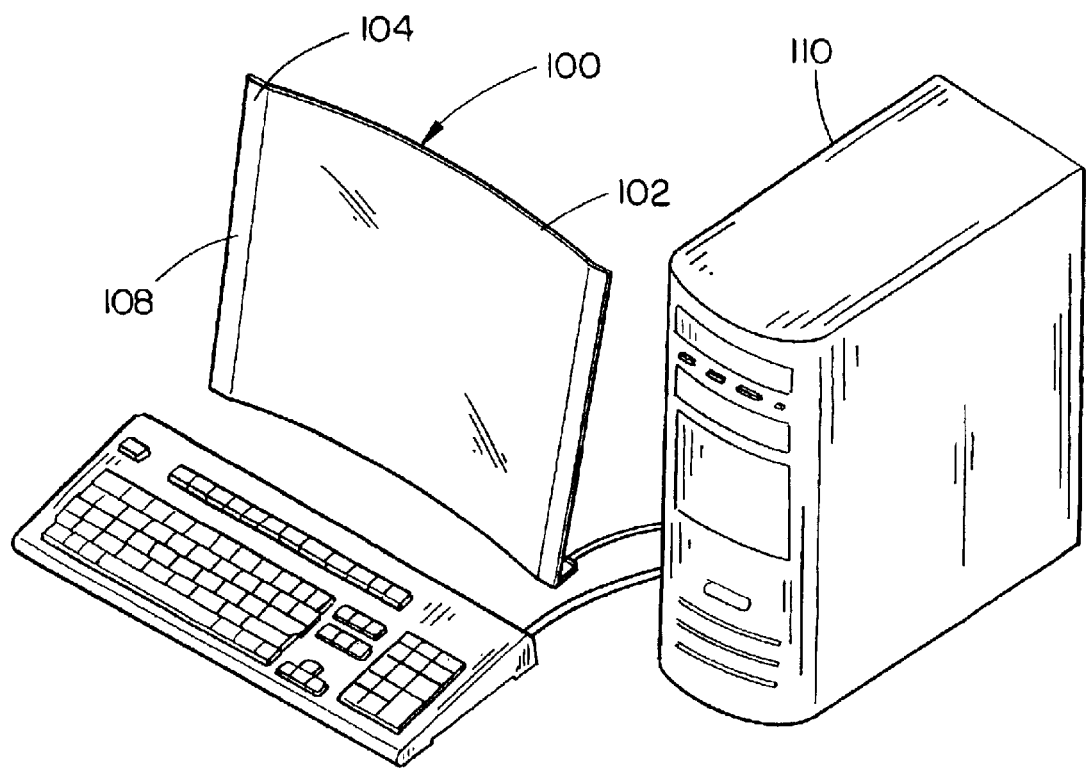
FIG. 1
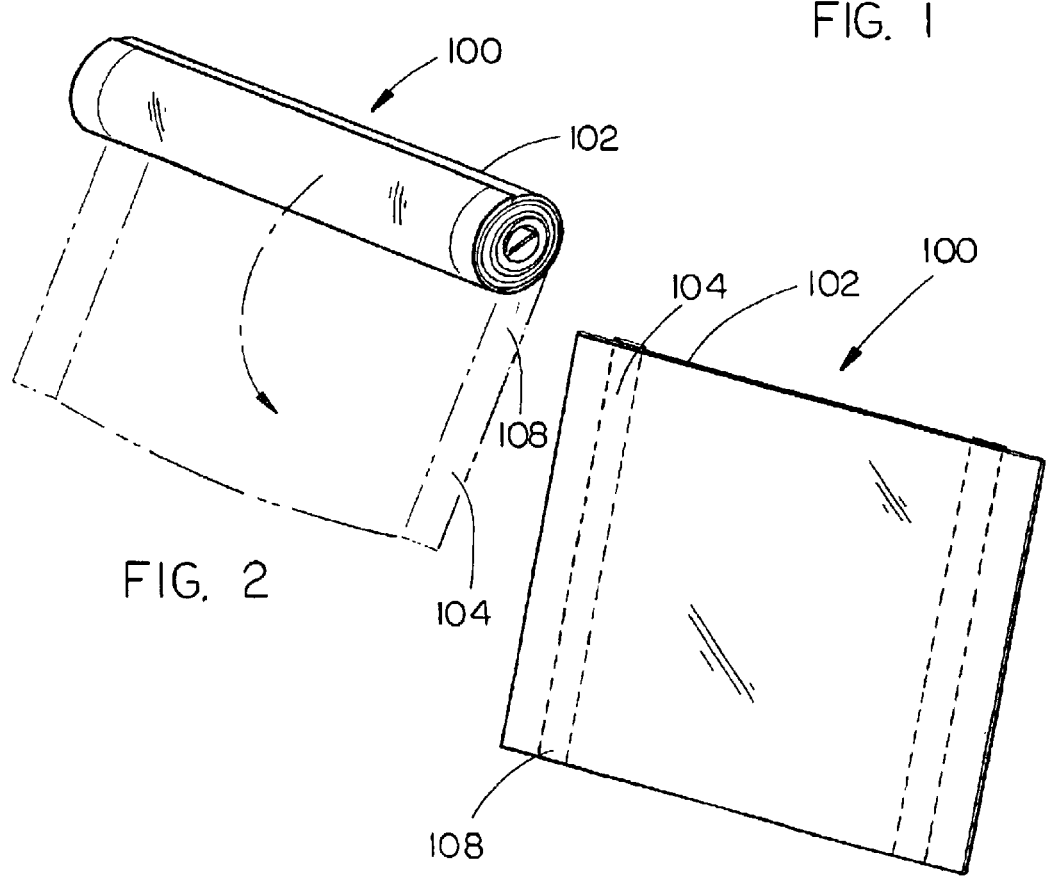
FIG. 2
FIG. 3

DISPLAY SUPPORT APPARATUS

FIELD OF THE INVENTION

The present invention generally relates to the field of displays, particularly to flexible panel displays such as Light Emitting Polymer (LEP) displays, Polymer Light Emitting Diode (PLED) displays, and the like, and particularly to an extendable support apparatus for supporting a flexible panel display in a viewing position.

BACKGROUND OF THE INVENTION

Flexible panel displays such as Light Emitting Polymer (LEP) displays, Polymer Light Emitting Diode (PLED) displays, and the like provide numerous advantages over conventional rigid Liquid Crystal Displays (LCD) displays. For example, polymer based flexible panel displays are cheaper to manufacture than rigid LCD displays, have a wider viewing angle than rigid LCD displays, and are more power efficient than rigid LCD displays. Moreover, the flexibility of such displays allows them to be rolled or coiled so that they may be stored in a more compact space when not in use.

Typically, it is contemplated that such flexible panel displays will be mounted on a vertical surface such as a wall, or the like. This mounting scheme works well for applications such as televisions, advertising displays, billboards and the like. However, some applications, particularly computer applications, require that the flexible panel display be supported in free space. For instance, the flexible panel display may be used as a display for a computer system, wherein it must be supported on a desktop surface. Similarly, the flexible panel display may be used as a display in a portable (e.g., laptop, notebook, or handheld) computer, wherein the display is extended when the computer is in use and may be coiled within the housing of the computer when not in use.

Consequently, it would be desirable to provide an extendable support apparatus for supporting a flexible panel display in a viewing position, wherein the support apparatus may be readily collapsed allowing the flexible panel display to be rolled upon itself and stored when not in use.

SUMMARY OF THE INVENTION

Accordingly, the present invention is directed to an extendable flexible display support apparatus for supporting a flexible panel display in a viewing position. The support apparatus includes an extension member that may be collapsed for allowing the flexible panel display to be at least partially rolled upon itself and stored when not in use.

In one embodiment, the flexible display support apparatus includes a semi-rigid extension member suitable for being coupled to the flexible panel display. The semi-rigid extension member is generally rigid when extended for supporting the flexible panel display in a viewing position. Preferably, the extension member is capable of being coiled for allowing the flexible panel display to be at least partially rolled upon itself when not in use for storage or the like.

In another embodiment, the flexible display support apparatus includes an extension member comprising a generally rigid armature suitable for being coupled to the flexible panel display. The armature is capable of pivoting or folding for allowing the flexible panel display to be at least partially rolled upon itself when not in use. An end of the generally rigid armature may be received within a channel disposed in the flexible panel display so that the end may move along the channel as the flexible panel display is rolled upon itself for collapsing the extension member.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an isometric view illustrating a computer system employing a flexible panel display assembly having a flexible display support apparatus in accordance with an exemplary embodiment of the present invention;

FIG. 2 is an isometric view illustrating the flexible panel display of the display assembly shown in FIG. 1, wherein the display is rolled or coiled;

FIG. 3 is an isometric view illustrating the flexible panel display of the display assembly shown in FIG. 1, wherein the display is unrolled or extended;

DETAILED DESCRIPTION OF THE INVENTION

Figure 4:
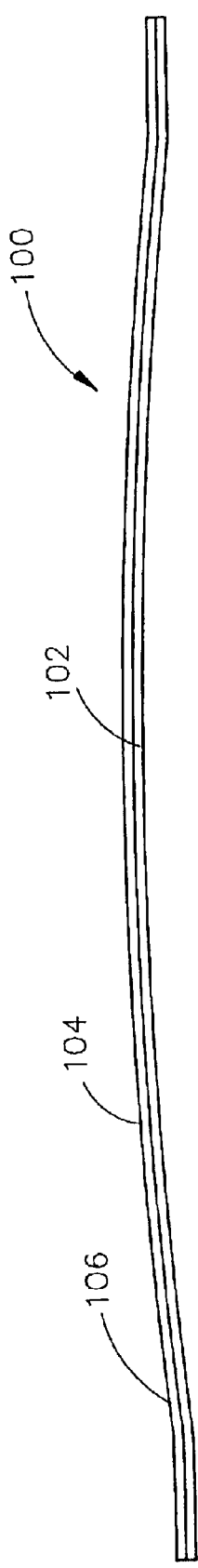
FIGS. 4, 5 and 6 are top plan views of the flexible panel display assembly shown in FIG. 1, further illustrating exemplary extension members of the display assembly.

The present invention provides an extendable flexible display support apparatus for supporting a flexible panel display in a viewing position. The support apparatus includes an extension member that may be collapsed for allowing the flexible panel display to be at least partially rolled upon itself and stored when not in use. Reference will now be made in detail to the presently preferred embodiments of the invention, examples of which are illustrated in the accompanying drawings.

FIGS. 1 through 6 illustrate display assemblies employing a flexible display support apparatus in accordance with an exemplary embodiment of the present invention. The display assemblies, generally designated by reference numeral 100, include a flexible panel display 102 to which flexible display support apparatus 104 may be attached. Flexible panel display 102 may comprise a Light Emitting Polymer (LEP) display, a Polymer Light Emitting Diode (PLED) display, or may utilize another flexible panel display technology known to one of skill in the art. Flexible display support apparatus 104 includes one or more semi-rigid extension members 106 or 108 suitable for being coupled to a flexible panel display 102. Each extension member 106 or 108 is generally rigid when extended, as shown in FIGS. 1 and 3, for supporting flexible panel display 102 in a viewing position. Preferably, when held in a viewing position, flexible panel display 102 is supported so that it is substantially flat (i.e., not folded or rolled) and positioned in a generally vertical orientation. However, it is contemplated that extension members 106 or 108 may cause flexible panel display 102 to be slightly curved to improve its rigidity, or angled with respect to the surface on which it is placed so that a user may adjust his or her viewing angle with respect to the display 102. Extension members 106 or 108 may be rolled or coiled with the flexible panel display 102, allowing it to be at least partially rolled upon itself as shown in FIG. 2, so that the display assembly 100 may be stored when not in use.

In embodiments of the invention, flexible panel display assembly 100 may be employed as a monitor for a computer system 110 for displaying information to a user or users. In such embodiments, connectors may be provided in the flexible panel display assembly 100 for coupling the assembly 100 to the computer system 110 for power and communication of data. Alternately, flexible panel display assembly 100 may be utilized as a monitor for viewing television, movies, or the like. In such embodiments, the flexible panel display assembly 100 may include connectors suitable for providing connection of the display assembly 100 to a television tuner, a video cassette recorder/player (VCR), a DVD (Digital Video Disc) player/recorder, or the like. Flexible panel display assembly 100 may also be used by a variety of small electronic devices such as portable DVD players, cellular telephones, wrist watches, pagers, and the like, allowing such devices to be provided with a retractable flexible display having an integral, extendable support apparatus.

Figure 5:
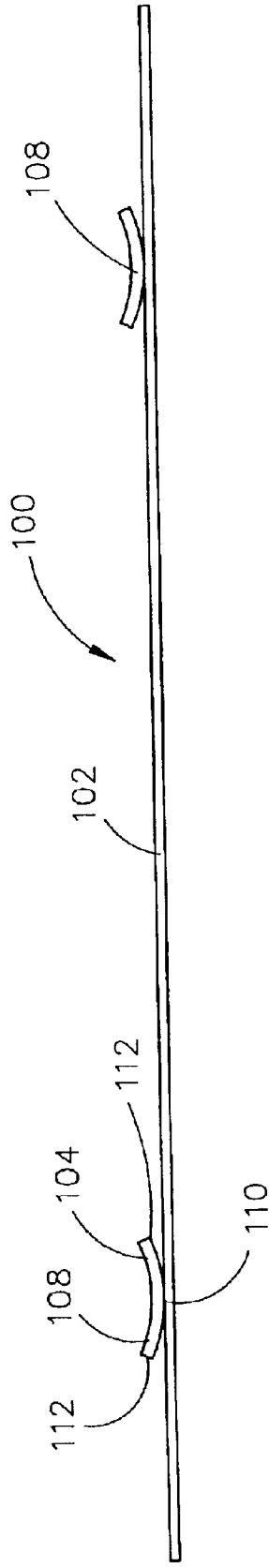
Figure 6:
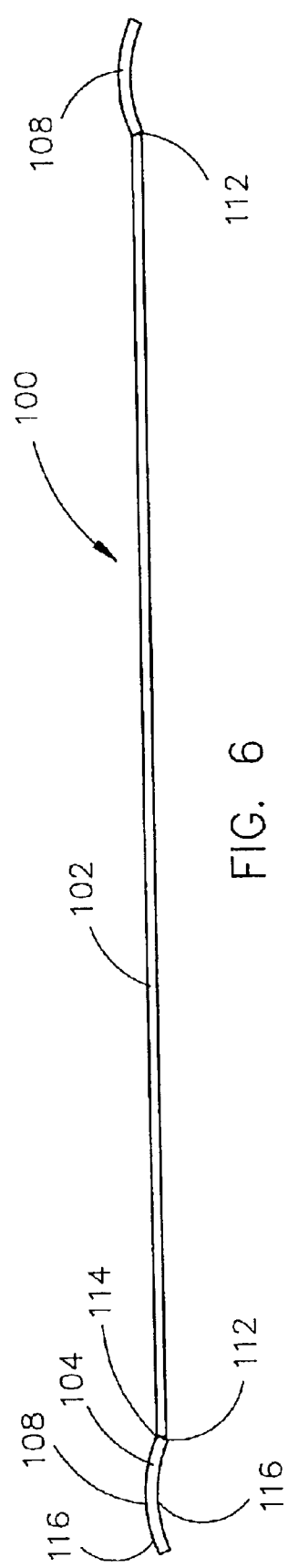

In the exemplary embodiments shown in FIGS. 4, 5 and 6, extension members 106 or 108 are generally curved in cross-section along its length when extended. This curvature provides stiffness and rigidity to the extension member. When coiled, extension members 106 or 108 substantially flatten in cross-section making the extension members 106 or 108 at least partially flexible so that they may collapse or coil for allowing the flexible panel display 102 to be rolled upon itself for storage or the like. In exemplary embodiments, extension members 106 or 108 are formed of a material having shape memory. In this manner, extension members 106 or 108 may be made to automatically acquire (e.g., "snap" to) the extended and/or coiled positions thereby rolling and unrolling the flexible panel display 102.

As shown in FIG. 4, extension member 106 comprises one or more sheets of the flexible panel display 102. In this manner, the display 102 is itself slightly curved, providing inherent stiffness to the display 102. For instance, in embodiments of the invention, extension member 106 may comprise the substrate of the flexible panel display 102 on which display elements such as the Light Emitting Polymers (LEP), Polymer Light Emitting Diodes (PLED), and the like are mounted. In such embodiments, the substrate may be formed of a material having shape memory, which is shaped to have a slightly curved cross-section along its length when extended. Alternately, extension member 106 may comprise an additional layer of material bonded to the substrate of the display 102. In such embodiments, this additional layer is comprised of a material having shape memory, which is formed to have a slightly curved cross-section along its length when extended.

As shown in FIGS. 5 and 6, each extension member 108 may alternately comprise a thin strip suitable for being attached to the flexible panel display 102. In such embodiments, the thin strip is generally curved in cross-section along its length when extended and is capable of flattening in cross-section when coiled allowing the flexible panel display 102 to be rolled upon itself for storage or the like. Preferably, extension members 108 may be permanently attached to flexible panel display 102. However, it will be appreciated that extension members 108 may alternately comprise a separate stand to which flexible panel display 102 may be temporarily mounted.

In the exemplary embodiment shown in FIG. 5, one or more extension members 108 are attached to the back of flexible panel display 102. As shown, extension members 108 may be attached to display 102 at their center of curvature 110. In such embodiments, flexible panel display 102 may roll upon itself so that its viewable surface remains to the outside of the roll as extension members 108 flatten and coil. Alternately, extension members 108 may be attached to display 102 at an edge 112. In such embodiments, flexible panel display 102 may roll upon itself so that its viewable surface remains to the inside of the roll as extension members 108 flatten and coil.

In the embodiment shown in FIG. 6, extension members 108 are attached to the vertical sides 114 of flexible panel display 102. Preferably, an edge 112 of extension member 108 is joined to each vertical side 114 of flexible panel display 102 so that the concave surface 116 of the extension member 108 faces forward (i.e., is disposed on the side of the display having the viewing surface). In such embodiments, flexible panel display 102 may roll upon itself so that its viewable surface remains to the inside of the roll as extension members 108 flatten and coil. Alternately, extension member 108 may be joined to the display 102 so that its convex surface 116 faces forward, allowing the display 102 to roll upon itself so that its viewable surface remains to the outside of the roll as extension members 108 flatten and coil.

It is contemplated that extension members 106 or 108 may be joined to flexible panel display 102 at points other than those specifically shown in FIGS. 4, 5 and 6. For example, sheet extension member 106 may alternately be comprised of a transparent layer bonded to the surface of the display 102. Consequently, such alteration of the preferred embodiments specifically disclosed herein by those of ordinary skill in the art would not depart from the scope and spirit of the present invention as claimed in the appended claims. Moreover, it will be appreciated that the rigidity or stiffness of extension members 106 and 108 may be controlled by varying the amount of curvature provided in the members 106 and 108 (i.e., by increasing or decreasing the radius of curvature). Thus, an extension member 106 or 108 having a greater amount of curvature will be stiffer than an extension member 106 or 108 having a lesser amount of curvature, and will thus provide a greater amount of support to the flexible panel display 102 when extended and be less easily coiled.

Figure 7:
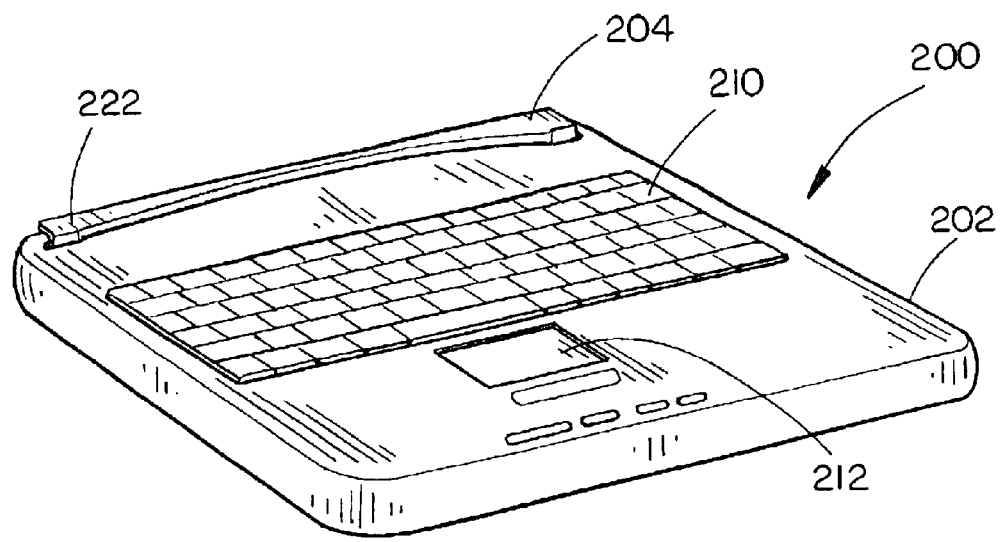
FIG. 7 is an isometric view illustrating a portable computer employing a flexible panel display assembly in accordance with an exemplary embodiment of the present invention, wherein the display assembly is retracted into the housing of the portable computer.
Figure 8:
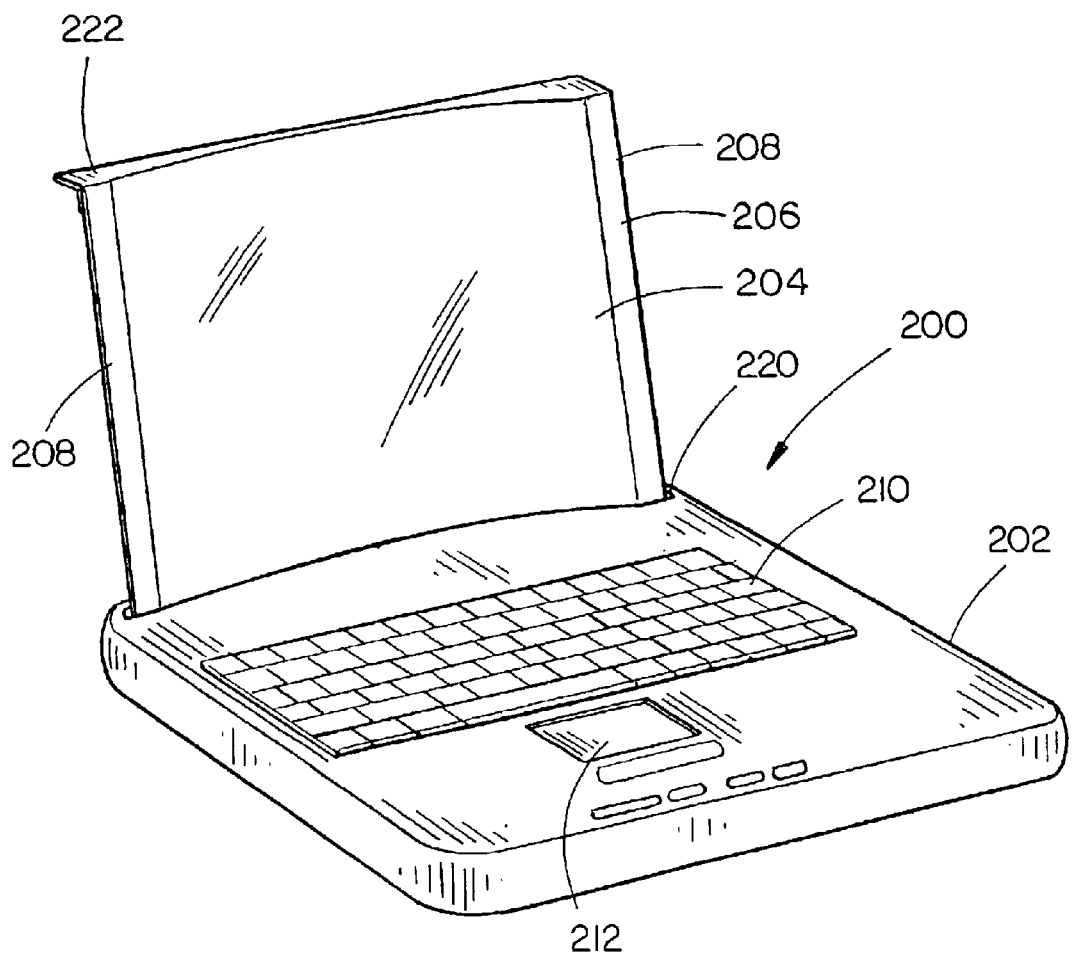
FIG. 8 is an isometric view of the portable computer shown in FIG. 7, wherein the display is shown extended from the housing of the portable computer.
Figure 9:
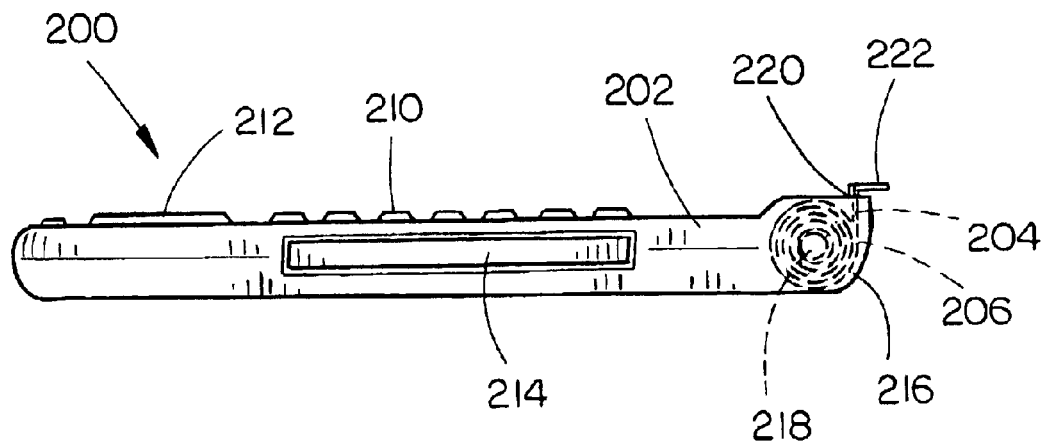
FIG. 9 is a partial cross-sectional side elevation view of the portable computer shown in FIG. 7, wherein the display is shown retracted into the housing of the portable computer.
Figure 10:
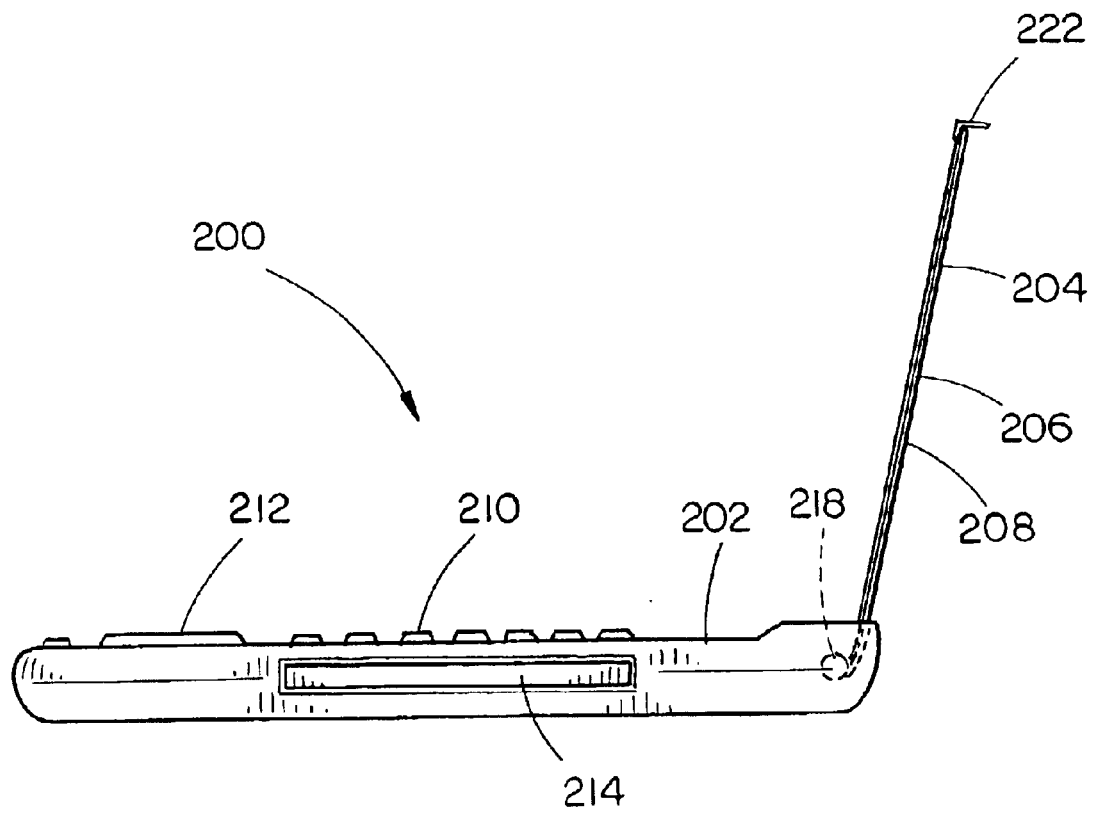
FIG. 10 is a partial cross-sectional side elevation view of the portable computer shown in FIG. 7, wherein the display is shown extended from the housing of the portable computer.

Referring now to FIGS. 7 through 10, a portable computer assembly employing a flexible panel display assembly in accordance with an exemplary embodiment of the present invention is described. The portable computer assembly 200 includes a housing 202, a flexible panel display 204 retractable into the housing 202, and a flexible display support apparatus 206 comprised of one or more extension members 208 coupled to flexible panel display 204 for supporting the display 204 in a viewing position when extended (FIG. 8). In accordance with the present invention, each extension member 208 is generally rigid when extended for supporting flexible panel display 204 when the display 204 is extended from housing 202 (FIGS. 8 and 10), and is capable of coiling for allowing flexible panel display 204 to be at least partially rolled upon itself when the display 204 is retracted into housing 202 (FIGS. 7 and 9).

In the embodiment shown, housing 202 is generally rectangular in shape and is sized to be suitable for being conveniently carried by a user. Housing 202 includes a keyboard 210 for facilitating entry of information and commands by a user and a cursor control device 212 such as a trackpad, trackstick, trackball or the like suitable for controlling a cursor displayed by flexible panel display 204 for selecting program applications, icons, commands, insertion points for text and graphics, or the like. Housing 202 may further house internal electrical and electronic components of the computer system 200 such as a motherboard supporting a processing system including a processor, a bus system, memory, and the like, a hard disk drive, a cooling fan, or the like. Housing 202 may also include one or more drives 214 for receiving removable media such as optical discs, magnetic (e.g., floppy) disks, and the like.

Housing 202 further includes a cavity or bay 216 (FIG. 9), positioned generally adjacent to and above keyboard 210 as viewed by a user of portable computer 200, for receiving flexible panel display 204 and support apparatus 206 when retracted. For instance, in the embodiment shown, flexible panel display 204 and support apparatus 206 may be retracted onto a reel or spool 218 disposed in bay 216, and extended from bay 216 through slot 220 formed in housing 202. In exemplary embodiments, spool 218 may be spring loaded for coiling extension members 208 of flexible display support apparatus 206 so that support apparatus 206 and flexible panel display 204 are caused to be rolled onto spool 218 when retracted.

A grip or handle 222 may be provided along the top edge of display 204. A user of portable computer assembly 200 may grasp handle 222 to extend and retract the display 204. Handle 222 may further provide rigidity to flexible panel display 204 during extension, and may cover slot 220 when flexible panel display 204 is retracted for preventing intrusion of environmental contaminants into the housing 202 of portable computer 200.

As discussed in the description of FIGS. 4, 5 and 6, each extension member 208 may be generally curved in cross-section along its length when extended. This curvature provides stiffness and rigidity to the extension member. When coiled, the extension member 208 substantially flattens in cross-section making the extension member 208 at least partially flexible so that they may collapse or coil for allowing the flexible panel display 204 to be rolled about spool 218 and retracted into bay 216. In embodiments of the invention, flexible display support apparatus 206 may include a single extension member 208 comprised of one or more sheets of flexible panel display 204 (as shown in FIG. 4). Alternately, flexible display support apparatus 206 may include one or more extension members 208 comprised of thin strips attached to the flexible panel display 204 (as shown in FIGS. 5 and 6). Moreover, in exemplary embodiments, extension member 208 may be formed of a material having shape memory. In this manner, extension member 208 may be made to automatically acquire (e.g., "snap" to) the extended and/or coiled positions thereby aiding in rolling and unrolling the flexible panel display 204.

Figure 11:
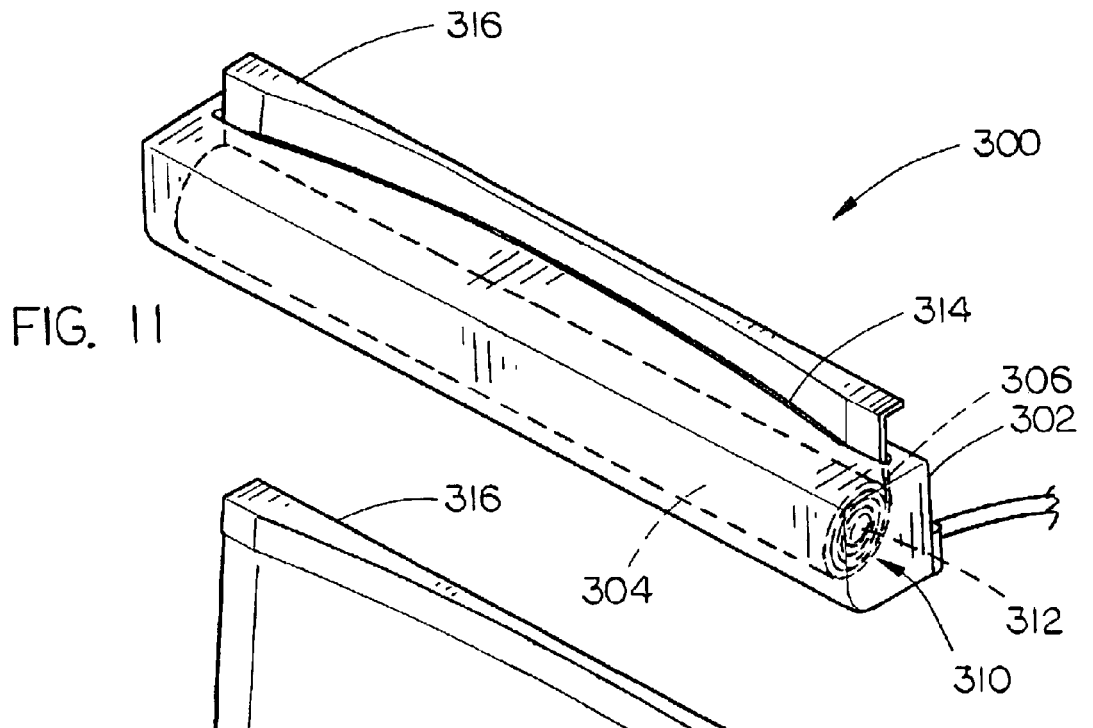
FIG. 11 is an isometric view illustrating a flexible panel display assembly employing a flexible panel display in accordance with an exemplary embodiment of the present invention, wherein the display is shown retracted within a housing of the display assembly.
Figure 12:
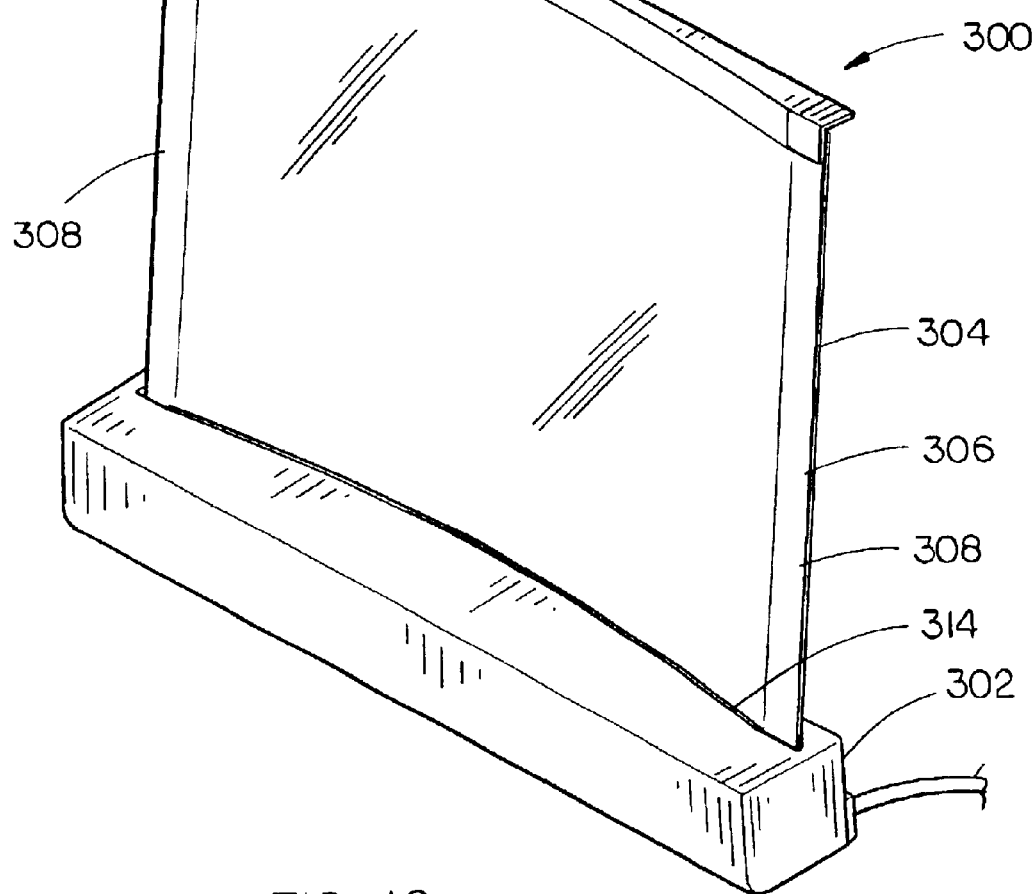
FIG. 12 is an isometric view of the flexible panel display assembly shown in FIG. 11, wherein the display is shown extended from the housing.
Figure 13:
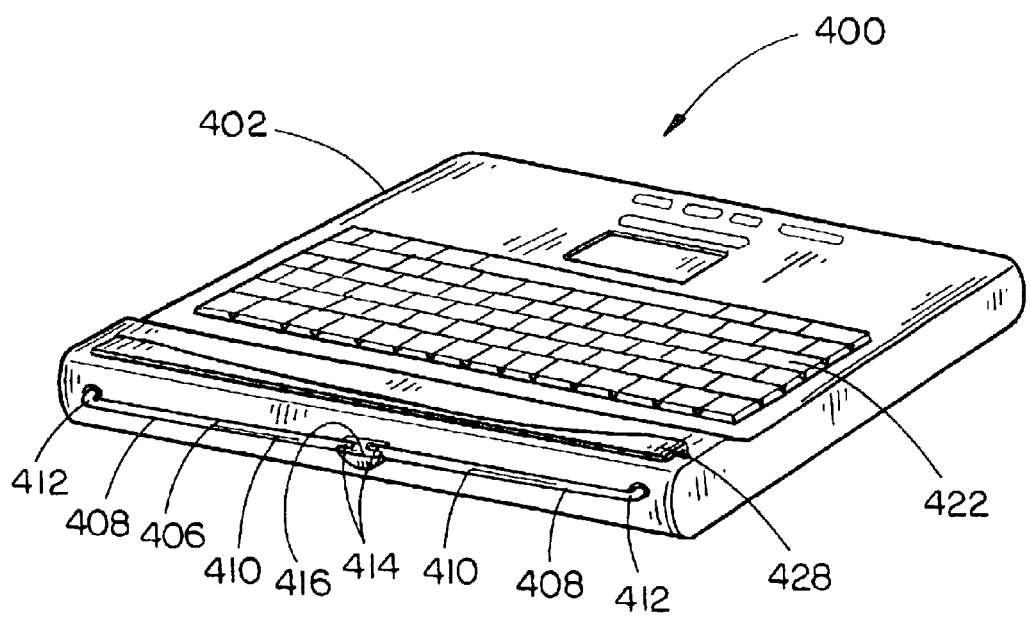
FIG. 13 is an isometric view illustrating a portable computer employing a flexible panel display assembly in accordance with an exemplary embodiment of the present invention, wherein the display assembly is retracted into the housing of the portable computer.

Referring now to FIGS. 11 and 12, a flexible panel display assembly in accordance with an exemplary embodiment of the present invention is described. The flexible panel display assembly 300 includes a housing 302, a flexible panel display 304 retractable into the housing 302 and an extension apparatus 306 comprised of one or more extension members 308 coupled to flexible panel display 304 for supporting the display 304 in a viewing position when extended (FIG. 9). Preferably, each extension member 308 is generally rigid when extended for supporting flexible panel display 304 when the display 304 is extended from housing 302 (FIG. 12), and is capable of coiling for allowing flexible panel display 304 to be at least partially rolled upon itself when the display 304 is retracted into housing 302 (FIG. 11).

Housing 302 includes a cavity 310 for receiving flexible panel display 304 and extension apparatus 306 when retracted (FIG. 11). In one embodiment, flexible panel display 304 and extension apparatus 306 may be retracted onto a reel or spool 312 disposed in cavity 310, and extended from cavity 310 through slot 314 formed in housing 302. In exemplary embodiments, spool 312 may be spring loaded for coiling extension members 308 of extension apparatus 306 so that extension apparatus 306 and flexible panel display 304 are caused to be rolled onto spool 312 when retracted.

A grip or handle 316 may be provided along the top edge of display 304. A user of flexible panel display assembly 300 may grasp handle 316 to extend and retract the display 304. Handle 316 may further provide rigidity to flexible panel display 304, and may at least partially cover slot 314 when flexible panel display 304 is retracted for preventing intrusion of environmental contaminants into housing 302.

As discussed in the description of FIGS. 4, 5 and 6, each extension member 308 may be generally curved in cross-section along its length when extended. This curvature provides stiffness and rigidity to the extension member. When coiled, the extension member 308 substantially flattens in cross-section making the extension member 308 at least partially flexible so that they may collapse or coil for allowing the flexible panel display 304 to be rolled about spool 312 and retracted into cavity 310. In embodiments of the invention, extension apparatus 306 may include a single extension member 308 comprised of one or more sheets of flexible panel display 304 (as shown in FIG. 4). Alternately or additionally, extension apparatus 306 may include one or more extension members 308 comprised of thin strips attached to the flexible panel display 304 (as shown in FIGS. 5 and 6). Moreover, as discussed during the description of FIGS. 1 through 6, extension members 308 may be formed of a material having shape memory. In this manner, extension members 308 may be made to automatically acquire (e.g., "snap" to) the extended and/or coiled positions thereby aiding in rolling and unrolling the flexible panel display 304.

Figure 14:
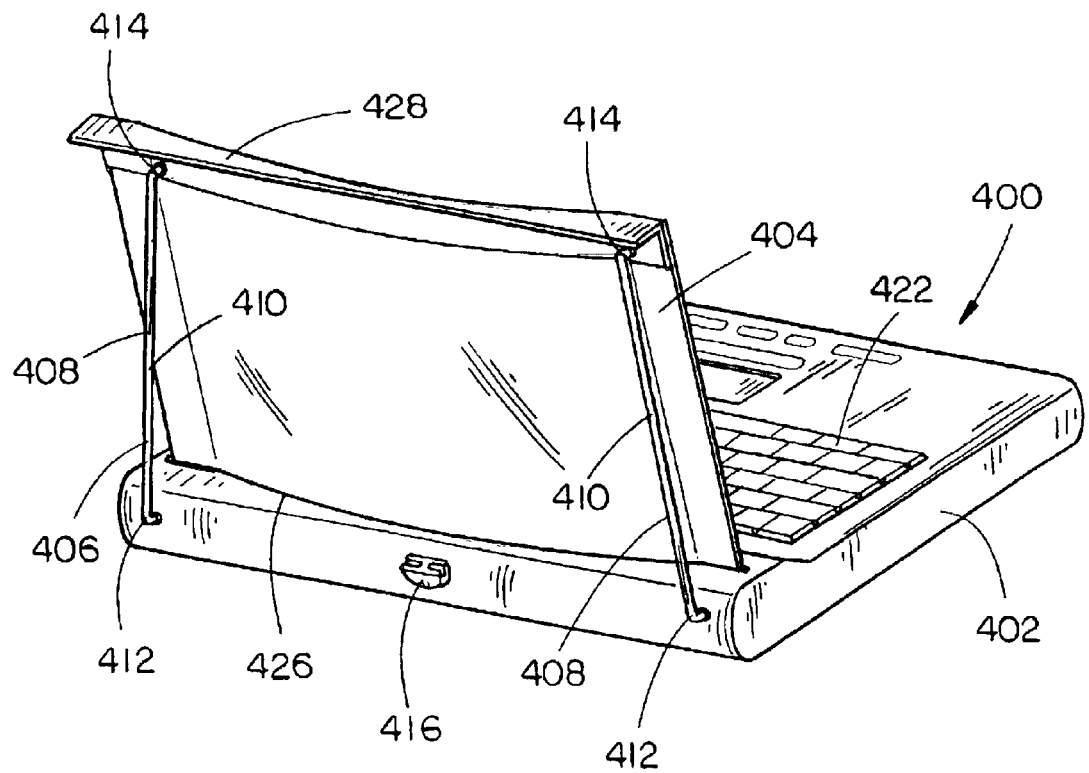
FIG. 14 is an isometric view of the portable computer shown in FIG. 13, wherein the display is shown extended from the housing of the portable computer.
Figure 15:
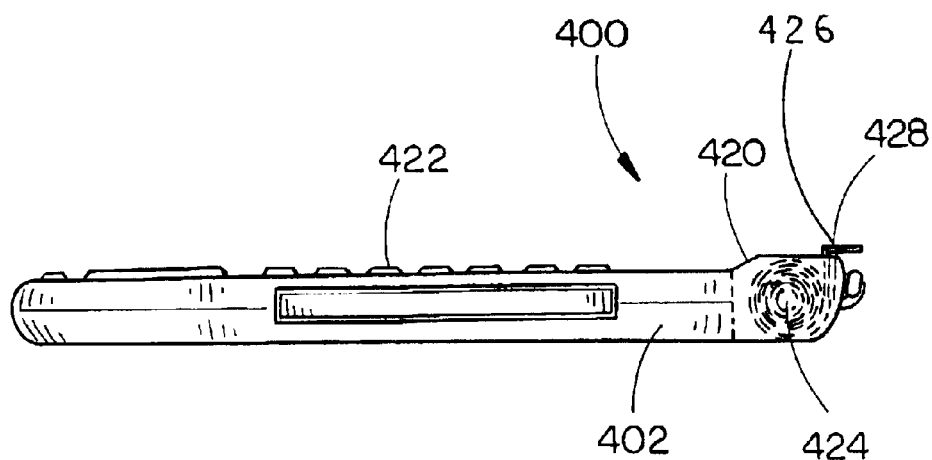
FIG. 15 is a partial cross-sectional side elevation view of the portable computer shown in FIG. 13, wherein the display is shown retracted into the housing of the portable computer.

Referring now to FIGS. 13 through 16, a portable computer assembly employing a flexible panel display assembly in accordance with an exemplary embodiment of the present invention is described. The portable computer assembly 400 includes housing 402, a flexible panel display 404 retractable into the housing 402, and a flexible display support apparatus 406. Flexible display support apparatus 406 is comprised of one or more extension members 408 that engage the flexible panel display 404 when extended for supporting the display 404 in a viewing position (FIG. 14).

Extension members 408 comprise generally rigid armatures 410, having a first end 412 pivotally attached to the housing 402 and a second end 414 that may engage the flexible panel display 404. Armatures 410 pivot or rotate between collapsed position shown in FIGS. 13 and 15 wherein second end 414 is retracted and held adjacent to or against housing 402, and an extended or raised position, shown in FIGS. 14 and 16, wherein the second ends 414 of armatures 410 may engage the flexible panel display 404 to support the display 404 in a viewing position. Alternately, extension members 408 may be pivoted from the top of flexible panel display 404, and may engage housing 402 for rigidity to support flexible panel display 404 in the extended position.

Figure 16:
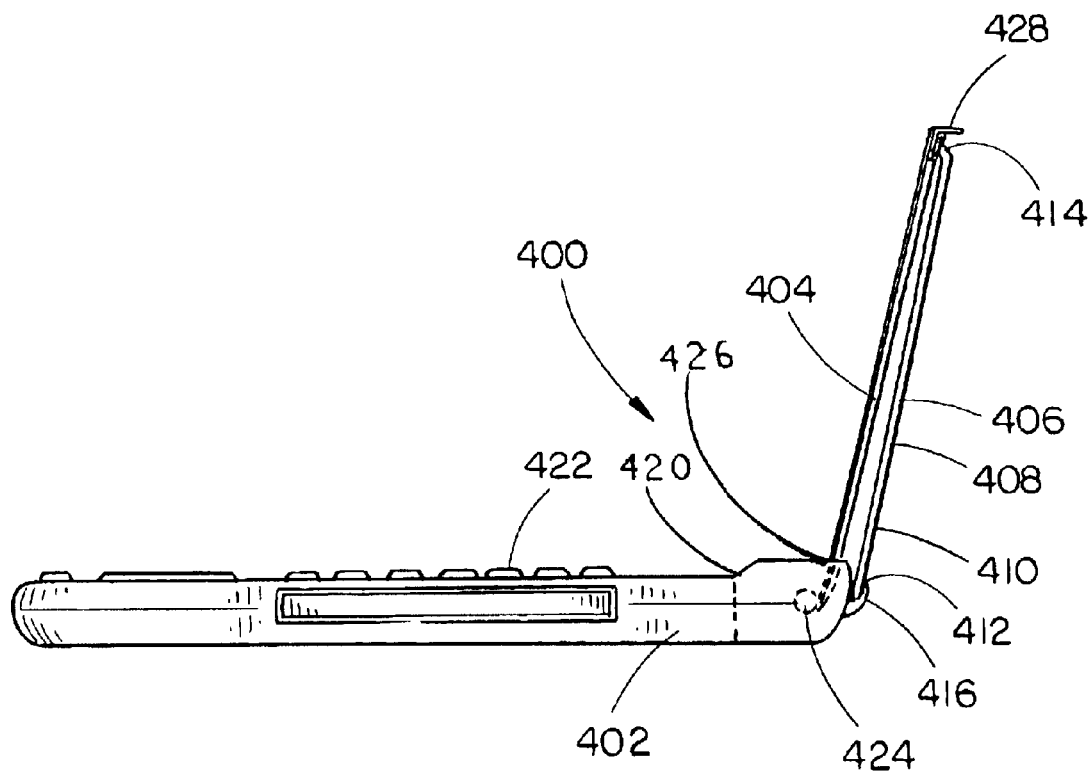
FIG. 16 is a partial cross-sectional side elevation view of the portable computer shown in FIG. 13, wherein the display is shown extended from the housing of the portable computer.

The housing 402 may include one or more retainers 416 positioned to receive and hold the second ends 414 of each armature 410, when the extension member 408 is in the collapsed or retracted position. When the flexible panel display 404 is extended to the viewing position, as shown in FIGS. 14 and 16, the second ends 414 are removed from retainer 416, allowing the extension members 408 to be rotated to their extended or upright positions. The second ends 414 of extension members 408 may then be engaged in sockets provided in handle 428 along the top edge of display 404 for supporting the flexible panel display 404 in the extended or viewing position.

The housing 402 includes a cavity or bay 420 (FIGS. 15 and 16), positioned generally adjacent to and above the keyboard 422 of the portable computer 400 as viewed by a user for receiving the flexible panel display 404 when retracted. In one embodiment, the flexible panel display 404 may be retracted onto a reel or spool 424 disposed in bay 420, and extended from bay 420 through slot 426 formed in housing 402. In exemplary embodiments, reel or spool 424 may be spring-loaded for causing flexible panel display 404 to be rolled onto spool 424 when retracted. A user of the portable computer assembly 400 may grasp grip or handle 428 to extend the display 404 from the housing 402 and to retract the display 404 into the housing 402. Handle 428 may further cooperate with armatures 410 to provide rigidity to flexible panel display 404 while extended, and may cover slot 426 when flexible panel display 404 is retracted to prevent intrusion of environmental contaminants into the housing 402 of the portable computer 400.

Figure 17:
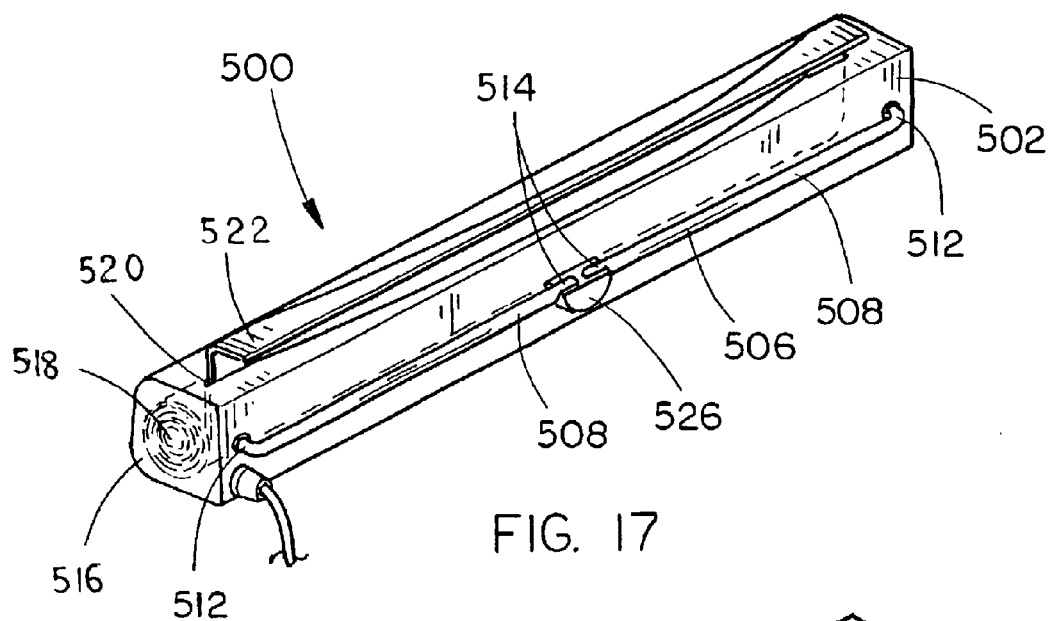
FIG. 17 is an isometric view illustrating a flexible panel display assembly employing a flexible panel display in accordance with an exemplary embodiment of the present invention, wherein the display is shown retracted within a housing of the display assembly.
Figure 18:
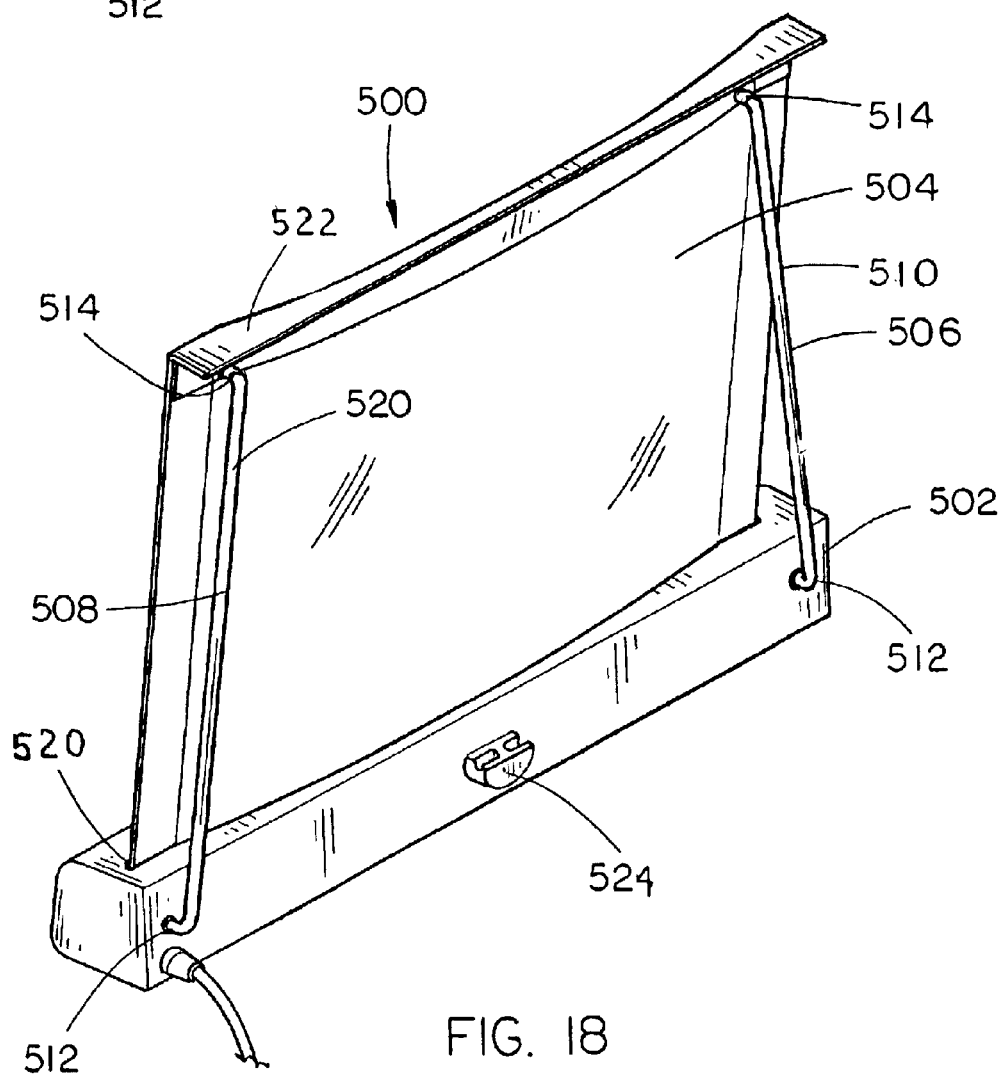
FIG. 18 is an isometric view of the flexible panel display assembly shown in FIG. 17, wherein the display is shown extended from the housing.

Referring now to FIGS. 17 and 18, a flexible panel display employing an extension apparatus having extension members comprised of rigid armatures in accordance with an exemplary embodiment of the present invention is described. The flexible panel display assembly 500 includes a housing 502, a flexible panel display 504 retractable into the housing 502 and an extension apparatus 506 comprised of one or more extension members 508 coupled to flexible panel display 504 for supporting the display 504 in a viewing position when extended (FIG. 18). Each extension member 508 comprises a generally rigid armature 510, having a first end 512 pivotally attached to the housing 502 and a second end 514 which may be attached to the flexible panel display 504 to support the flexible panel display 504 when the display 504 is extended from housing 502 in a viewing position (FIG. 18). When flexible panel display 502 is not in use, the extension members 508 may be pivoted to a collapsed position, allowing the flexible panel display 504 to be at least partially rolled upon itself and retracted into housing 502.

The housing 502 further includes a cavity 516 for receiving flexible panel display 504 when retracted (FIG. 17). For example, flexible panel display 504 may be retracted onto a reel or spool 518 disposed in cavity 516, and extended from cavity 516 through slot 520 formed in housing 502. A grip or handle 522 may be provided along the top edge of display 504. A user of flexible panel display assembly 500 may grasp handle 522 to extend and retract the display 504. Handle 522 may further provide rigidity to flexible panel display 504 during extension and while extended, and may at least partially cover slot 520 when flexible panel display 504 is retracted for preventing intrusion of environmental contaminants into housing 502. In exemplary embodiments, spool 518 may be spring-loaded for coiling flexible panel display 504 so that the display 504 may be rolled onto spool 518 when retracted.

Each extension member 508 may pivot or rotate between collapsed position shown in FIG. 17, wherein second end 514 is retracted and held adjacent to or against housing 502, and an extended position, shown in FIG. 18, wherein the extension member 508 support the flexible panel display 504 when the display 504 is extended from housing 502 in a viewing position.

The housing 502 may include one or more retainers 524 positioned to receive and hold the second ends 514 of each armature 510, when the extension member 508 is in the collapsed or retracted position. When the flexible panel display 504 is extended to the viewing position, as shown in FIG. 18, the second ends 514 are removed from retainer 524, allowing the extension members 508 to be rotated to their extended or upright positions. The second ends 514 of extension members 508 may then be engaged in sockets provided in handle 516 provided along the top edge of display 504 for supporting the flexible panel display 504 in the extended or viewing position. Alternately, extension members 508 may be pivoted from the top of flexible panel display 504, and may engage housing 502 for rigidity to support flexible panel display 504 in the extended position. In such an embodiment, retainers 524 are positioned at the top of flexible panel display 504, while the sockets receiving second ends of armatures 510 are positioned in housing 502.

Figure 19:
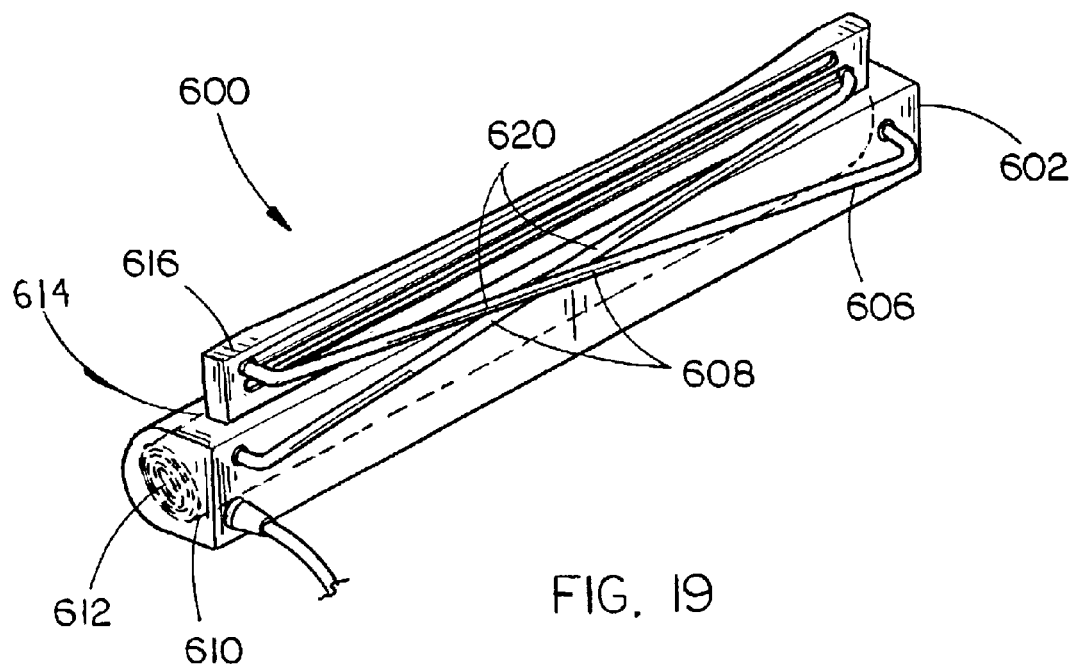
FIG. 19 is an isometric view illustrating a flexible panel display assembly employing a flexible panel display in accordance with an exemplary embodiment of the present invention, wherein the display is shown retracted within a housing of the display assembly.
Figure 20:
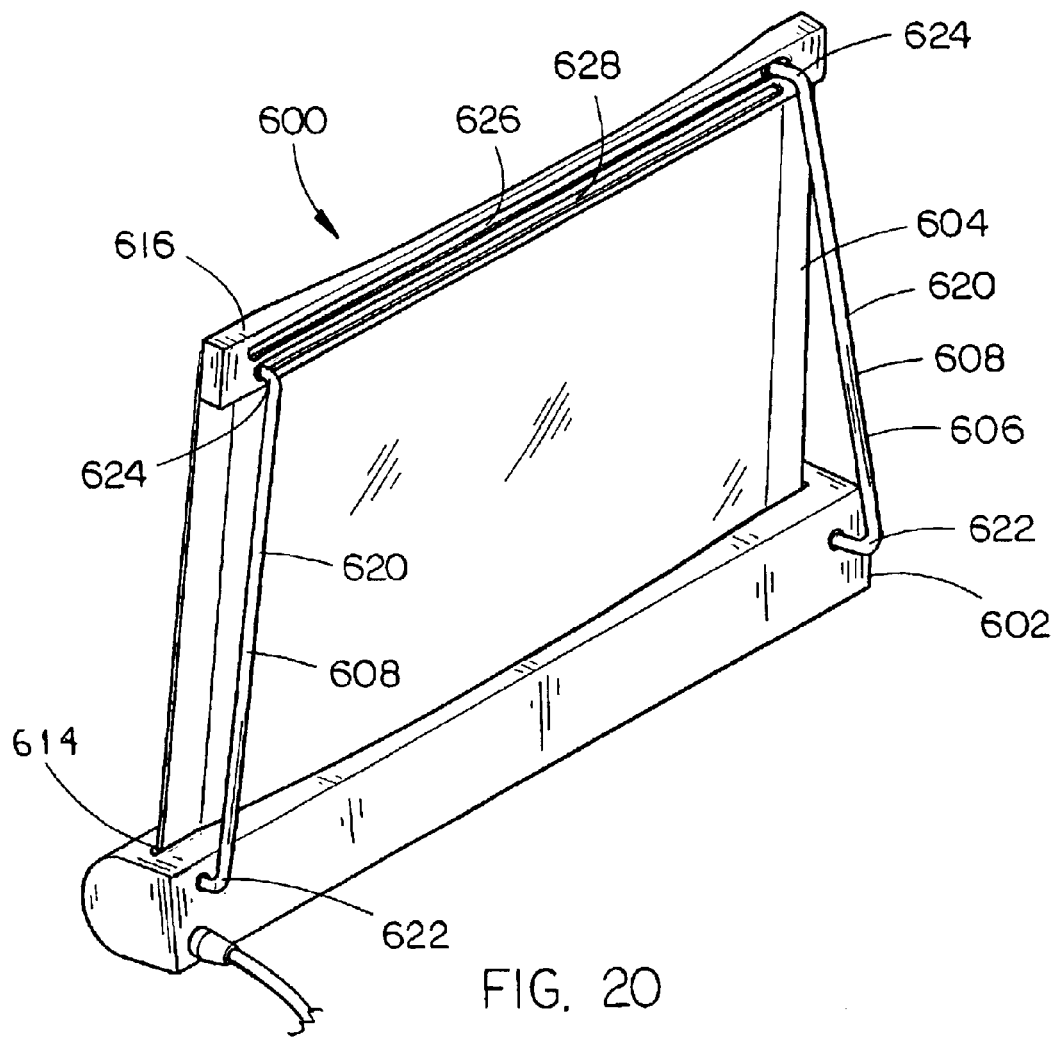
FIG. 20 is an isometric view of the flexible panel display assembly shown in FIG. 19, wherein the display is shown extended from the housing.

Turning now to FIGS. 19 and 20, a flexible panel display employing an extension apparatus having extension members comprised of rigid armatures in accordance with yet another exemplary embodiment of the present invention is described. The flexible panel display assembly 600 includes a housing 602, a flexible panel display 604 retractable into the housing 602 and an extension apparatus 606 comprised of one or more extension members 608 coupled to flexible panel display 604 for supporting the display 604 in a viewing position when extended (FIG. 20).

In the exemplary embodiment shown, the housing 602 includes a cavity 610 for receiving flexible panel display 604 when retracted (FIG. 19). Flexible panel display 604 may be retracted onto a reel or spool 612 disposed in cavity 610, and extended from cavity 610 through slot 614 formed in housing 602. In exemplary embodiments, spool 612 may be spring-loaded for coiling flexible panel display 504 so that the display 604 may be rolled onto spool 612 when retracted. A grip or handle 616 may be provided along the top edge of display 604. A user of flexible panel display assembly 600 may grasp handle 616 to extend and retract the display 604. Handle 616 may further provide rigidity to flexible panel display while extended, and may at least partially cover slot 614 when the flexible panel display 604 is retracted for preventing intrusion of environmental contaminants into the housing 602. Alternately, the flexible panel display assembly 600 may be provided with a motorized drive system coupled to one or both extension members 608 of extension apparatus 606 for raising and lowering the display 602.

Extension members 608 comprise generally rigid armatures 620 having a first end 622 pivotally attached to the housing 602 and a second end 624 slidably received within one of upper and lower generally horizontal channels 626 and 628 disposed in the handle 616 of the flexible panel display 604. Each extension member 608 may pivot or rotate between the collapsed position, shown in FIG. 19, wherein the flexible panel display is retracted into the housing 602, and an extended position, shown in FIG. 20, wherein the flexible panel display 604 is extended from the housing 602 so as to be held in a viewing position.

As the flexible panel display 604 is extended from the retracted position to the viewing position, the second ends 624 of armatures 620 move along their respective channels 626 and 628 until the armatures 620 are raised to a substantially vertical orientation. A detent may be provided at the end of each channel 626 and 628 for receiving second ends 624 to hold the armatures 620 in this extended or raised position. Similarly, as the flexible panel display 604 is moved from the extended position to the retracted position, the second ends 624 of armatures 620 move along their respective channels 626 and 628 until armatures 620 are collapsed or lowered to a substantially horizontal crossed orientation shown in FIG. 19. A second detent may be provided at the end of each channel 626 opposite the first detent to receive the second ends 624 of armatures 620 to hold the armatures 620 in the collapsed position. It will be appreciated that one armature 620 is extended farther from housing 602 than the other, allowing armatures 620 to cross when collapsed.

In the exemplary embodiment illustrated in FIGS. 19 and 20, extension apparatus 606 is shown integrated into a stand-alone display assembly 600 for purposes of illustration of this embodiment of the invention. However, it will be appreciated by those of skill in the art that the crossing extension members 608 of extension apparatus 606 may also be incorporated in a portable computer such as portable computer 400 shown in FIGS. 13 through 16, or the like without departing from the scope and spirit of the present invention.

It is believed that the flexible panel display support apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A support apparatus for a flexible panel display, comprising:
    an extension member suitable for being coupled to the flexible panel display, the extension member being suitable for supporting the flexible panel display in a viewing position,
    wherein the extension member is capable of collapsing for allowing the flexible panel display to be at least partially rolled upon itself; and
    wherein the extension member comprises a semi-rigid extension member, the semi-rigid extension member being generally rigid when extended and being capable of coiling when collapsed; and
    wherein the extension member is generally curved in cross-section along its length when extended.

2. The support apparatus as claimed in claim 1, wherein the extension member is rolled with the flexible panel display when collapsed.

3. The support apparatus as claimed in claim 1, wherein the extension member is capable of flattening in cross-section when coiled.

4. The support apparatus as claimed in claim 1, wherein the extension member comprises a thin strip suitable for being attached to the flexible panel display.

5. The support apparatus as claimed in claim 1, wherein the extension member comprises a thin strip suitable for being attached to the flexible panel display, the thin strip is capable of flattening in cross-section when coiled.

6. The support apparatus as claimed in claim 1, wherein the extension member comprises a sheet of the flexible panel display.

7. The support apparatus as claimed in claim 1, wherein the extension member comprises a sheet of the flexible panel display, the sheet being capable of flattening in cross-section when coiled.

8. The support apparatus as claimed in claim 1, wherein the extension member comprises a material having shape memory.

9. The support apparatus as claimed in claim 1, wherein the extension member comprises a generally rigid armature.

10. The support member as claimed in claim 9, wherein an end of the generally rigid armature is received within a channel disposed in the flexible panel display, the end being capable of moving along the channel as the flexible panel display is rolled upon itself for collapsing the extension member.

11. A flexible panel display assembly, comprising:
a flexible panel display; and
an extension member coupled to the flexible panel display, the extension member being suitable for supporting the flexible panel display in a viewing position,
wherein the extension member is capable of collapsing for allowing flexible panel display to be at least partially rolled upon itself; and
wherein the extension member comprises a semi-rigid extension member, the semi-rigid extension member being generally rigid when extended and being capable of coiling when collapsed; and
wherein the extension member is generally curved in cross-section along its length when extended.

12. The flexible panel display assembly as claimed in claim 11, wherein the extension member is rolled with the flexible panel display when collapsed.

13. The flexible panel display assembly as claimed in claim 11, wherein the extension member is capable of flattening in cross-section when coiled.

14. The flexible panel display assembly as claimed in claim 11, wherein the extension member comprises a thin strip suitable for being attached to the flexible panel display.

15. The flexible panel display assembly as claimed in claim 11, wherein the extension member comprises a thin strip suitable for being attached to the flexible panel display, the thin strip being capable of flattening in cross-section when coiled.

16. The flexible panel display assembly as claimed in claim 11, wherein the extension member comprises a sheet of the flexible panel display.

17. The flexible panel display assembly as claimed in claim 11, wherein the extension member comprises a sheet of the flexible panel display, the sheet being capable of flattening in cross-section when coiled.

18. The flexible panel display assembly as claimed in claim 11, wherein the extension member comprises a material having shape memory.

19. The flexible panel display assembly as claimed in claim 11, further comprising a housing, the flexible panel display being retractable into the housing, wherein the extension member comprises a generally rigid armature including a first end suitable for being coupled to the flexible panel display and a second end pivotally coupled to the housing.

20. The flexible panel display assembly as claimed in claim 19, wherein a first end of the generally rigid armature is received within a channel disposed in the flexible panel display, the first end being capable of moving along the channel as the flexible panel display is coiled for collapsing the extension member.

21. A computer assembly, comprising:
a housing;
a flexible panel display retractable into the housing; and
an extension member coupled to the flexible panel display, the extension member being suitable for supporting the flexible panel display when the flexible panel display is extended from the housing,
wherein the extension member is capable of collapsing for allowing the flexible panel display to be at least partially rolled upon itself when the flexible panel display is retracted into the housing; and
wherein the extension member comprises a semi-rigid extension member, the semi-rigid extension member being generally rigid when extended and being capable of coiling when collapsed; and
wherein the extension member is generally curved in cross-section alone its length when extended.

22. The flexible panel display as claimed in claim 21, wherein the extension member is rolled with the flexible panel display when collapsed.

23. The computer assembly as claimed in claim 21, wherein the extension member is capable of flattening in cross-section when coiled.

24. The computer assembly as claimed in claim 21, wherein the extension member comprises a thin strip suitable for being attached to the flexible panel display.

25. The computer assembly as claimed in claim 21, wherein the extension member comprises a thin strip suitable for being attached to the flexible panel display, the thin strip being capable of flattening in cross-section when coiled.

26. The computer assembly as claimed in claim 21, wherein the extension member comprises a sheet of the flexible panel display.

27. The computer assembly as claimed in claim 21, wherein the extension member comprises a sheet of the flexible panel display, the sheet being capable of flattening in cross-section when coiled.

28. The computer assembly as claimed in claim 21, wherein the extension member comprises a material having shape memory.

29. The computer assembly as claimed in claim 21, further comprising a housing, the flexible panel display being retractable into the housing, wherein the extension member comprises a generally rigid armature including a first end suitable for being coupled to the flexible panel display and a second end pivotally coupled to the housing.

30. The computer assembly as claimed in claim 29, wherein a first end of the generally rigid armature is received within a channel disposed in the flexible panel display, the first end being capable of moving along the channel as the flexible panel display is coiled for collapsing the extension member.

31. A support apparatus for a flexible panel display, comprising:
an extension member suitable for being coupled to the flexible panel display, the extension member being suitable for supporting the flexible panel display in a viewing position;
wherein the extension member is capable of collapsing for allowing the flexible panel display to be at least partially rolled upon itself; and
wherein the extension member comprises a generally rigid armature, an end of the generally rigid armature being received within a channel disposed in the flexible panel display, the end being capable of moving along the channel as the flexible panel display is rolled upon itself for collapsing the extension member.

32. A flexible panel display assembly, comprising:
a flexible panel display;
an extension member coupled to the flexible panel display, the extension member being suitable for supporting the flexible panel display in a viewing position, wherein the extension member is capable of collapsing for allowing flexible panel display to be at least partially rolled upon itself; and
a housing, the flexible panel display being retractable into the housing, wherein the extension member comprises a generally rigid armature including a first end suitable for being coupled to the flexible panel display and a second end pivotally coupled to the housing, wherein the first end of the generally rigid armature is received within a channel disposed in the flexible panel display, the first end being capable of moving along the channel as the flexible panel display is coiled for collapsing the extension member.

33. A computer assembly, comprising:

a housing;

a flexible panel display retractable into the housing;

an extension member coupled to the flexible panel display, the extension member being suitable for supporting the flexible panel display when the flexible panel display is extended from the housing, wherein the extension member is capable of collapsing for allowing the flexible panel display to be at least partially rolled upon itself when the flexible panel display is retracted into the housing; and a housing, the flexible panel display being retractable into the housing, wherein the extension member comprises a generally rigid armature including a first end suitable for being coupled to the flexible panel display and a second end pivotally coupled to the housing, wherein the first end of the generally rigid armature is received within a channel disposed in the flexible panel display, the first end being capable of moving along the channel as the flexible panel display is coiled for collapsing the extension member.

\* \* \* \* \*